United States Patent [19]

Kim

[11] Patent Number: 5,234,224
[45] Date of Patent: Aug. 10, 1993

[54] MULTI-FUNCTION BABY SUPPORT AND TRANSPORT APPARATUS

[76] Inventor: Chung B. Kim, 121 Hillcrest Ave., Pittsburg, Calif. 94565

[21] Appl. No.: 782,965

[22] Filed: Oct. 21, 1991

[51] Int. Cl.$^5$ ............................ B62B 7/10; B62B 7/12
[52] U.S. Cl. .................................... 280/30; 280/643; 280/648; 280/650; 280/47.4; 297/125; 297/130
[58] Field of Search ............... 280/642, 643, 644, 648, 280/649, 650, 658, 30, 47.38, 47.4; 297/125, 126, 130, 250

[56] References Cited

U.S. PATENT DOCUMENTS

| | | | |
|---|---|---|---|
| 780,311 | 1/1905 | Steinbach | 297/126 |
| 1,147,191 | 7/1915 | Rundle | 280/30 |
| 1,302,343 | 4/1919 | Farrer | |
| 2,575,189 | 11/1951 | Schmidt | 280/643 X |
| 2,790,484 | 4/1957 | Pollack | |
| 2,814,334 | 11/1957 | Lane | 297/125 |
| 2,982,562 | 5/1961 | Gladstein | 280/30 X |
| 3,094,339 | 6/1963 | Hurvitz | 280/31 |
| 3,109,666 | 11/1963 | Wilson | 280/30 |
| 3,111,332 | 11/1963 | Birch | 280/31 |
| 3,170,709 | 2/1965 | Shackel | 280/47.34 |
| 3,411,799 | 11/1968 | Felsher | 280/649 |
| 3,649,074 | 3/1972 | McDonald et al. | 297/130 X |
| 4,294,464 | 10/1981 | Ettridge | 280/649 |
| 4,786,064 | 11/1988 | Baghdasarian | 280/30 |
| 4,946,180 | 8/1990 | Baer | 280/39 |

FOREIGN PATENT DOCUMENTS

| | | | |
|---|---|---|---|
| 1918096 | 11/1970 | Fed. Rep. of Germany | 280/47.38 |
| 753337 | 7/1956 | United Kingdom | 280/47.38 |

*Primary Examiner*—Brian Johnson
*Attorney, Agent, or Firm*—Schapp and Hatch

[57] ABSTRACT

Multi-function baby support and transport apparatus including a wheeled, vertically-extensible frame, the uppermost member of which is adapted to carry a baby seat. The frame includes locking means for locking it in several different configurations, in each of which configurations the uppermost member is at a different elevation from a horizontal plane surface which bears the apparatus. A propelling handle is pivotably mounted on the uppermost member and can be positioned in an upright propelling position or in a horizontal position in which it is closely juxtaposed to the uppermost member. A folding diaper changing table is affixed to the propelling handle, and thus can be used for changing diapers when the propelling handle is in a horizontal position.

8 Claims, 4 Drawing Sheets

MULTI-FUNCTION BABY SUPPORT AND TRANSPORT APPARATUS

BACKGROUND OF THE INVENTION

1. Field of the Invention

My invention relates to infant wheel goods, and more particularly to multi-function baby support and transport apparatus.

2. Description of the Prior Art

Multi-function baby support and transport apparatus are known in the prior art. For example, such apparatus are disclosed and claimed in the following United States Letters Patent.

U.S. Pat. No. 4,946,180 (Baer)
U.S. Pat. No. 4,786,064 (Baghdasarian)
U.S. Pat. No. 3,170,709 (Shackel)
U.S. Pat. No. 3,111,332 (Birch)
U.S. Pat. No. 3,109,666 (Wilson)
U.S. Pat. No. 3,094,339 (Hurvitz)
U.S. Pat. No. 2,790,484 (Pollack)
U.S. Pat. No. 1,302,343 (Farrer).

None of the apparatus of these prior art patents achieves the instant convertibility from one form to another which is a characteristic feature of the present invention.

None of the apparatus of these prior art patents is convertible from one form to another by little more than the operation of a single control member.

In the convertible child support apparatus for Baer and Baghdasarian, the ground wheels are not detached when the apparatus is used as a car seat, and thus there is a risk of staining or otherwise damaging the automobile seat upon which the apparatus is placed if the apparatus, used as a stroller, has previously been wheeled over wet, snowy or muddy ground surfaces.

The term "prior art" as used herein or in any statement made by or on behalf of applicant means only that any document or thing referred to as prior art bears, directly or inferentially, a date which is earlier than the effective filing date hereof.

No representation or admission is made that any of the above-listed documents is part of the prior art, or that no more pertinent information exists.

SUMMARY OF THE INVENTION

Accordingly, it is an object of my invention to provide multi-function baby support and transport apparatus which is instantly convertible from a stroller configuration to a highchair configuration by operating a single control member while manually raising or lowering the safety car seat portion thereof to the corresponding elevation.

A further object of my invention is to provide multi-function baby support and transport apparatus of this type in which the safety car seat (hereinafter "car seat") is securely locked at the selected elevation by merely releasing said control member.

An additional object of my invention is to provide multi-function baby support and transport apparatus of this type in which said control member is a conveniently accessible foot peddle.

Yet another object of my present invention is to provide multi-function baby support and transport apparatus of this type in which more than two car seat elevations are available, some elevations being suitable for use in the stroller mode of operation and some for use in the highchair mode of operation.

A yet further object of my present invention is to provide multi-function baby support and transport apparatus of this type in which the car seat is detachable from the remaining portion (called the "undercarriage") so that there is no risk of the ground wheels contacting and staining or otherwise damaging the upholstery of an automobile seat on which the car seat is placed.

Another object of my present invention is to provide multi-function baby support and transport apparatus in which, after detaching the car seat, the undercarriage can be instantly collapsed by (1) operating said control member and (2) folding the handle against the remainder of the undercarriage, whereafter the undercarriage may be immediately stored in the trunk of the automobile carrying the car seat, even when that automobile has a very small trunk.

Other objects of my present invention will in part be obvious and will in part appear hereinafter.

My present invention, accordingly, comprises the apparatus embodying the features of construction, combinations of elements, and arrangements of parts exemplified in the following disclosure, and the scope of my present invention will be indicated in the claims appended hereto.

In accordance with a principal feature of my present invention multi-function baby support and transport apparatus are provided, each of which apparatus is comprised of a baby seat (e.g., a baby seat of the type which is sometimes called a "safety car seat" or "car seat") and a wheeled, vertically-expansible undercarriage to the top to which the baby seat is adapted to be secured.

In accordance with another principal feature of my present invention, said undercarriage is provided with elevation setting means whereby the elevation of the baby seat bearing portion of the undercarriage above the surface on which the undercarriage stands, may be locked at any selected one of a plurality of predetermined distances.

In accordance with a yet further principal feature of my present invention, said undercarriage is comprised of a horizontal upper frame, sometimes called herein the "platform frame", to which said baby seat may be detachably affixed.

In accordance with another principal feature of my present invention, said undercarriage is so constructed and arranged that said platform frame remains parallel to a horizontal plane surface on which said undercarriage is disposed, whatever the selected elevation of the platform frame.

In accordance with yet another principal feature of my present invention, said platform frame is supported from the remainder of said undercarriage by two pairs of upper pantograph links, each of which upper pantograph links are pivotably affixed to said platform frame.

In accordance with an additional principal feature of my present invention, coangulating means are provided whereby each upper pantograph link is constrained at all times to maintain the same angle with respect to said platform frame as the other upper pantograph link of the same pair.

In accordance with another principal feature of my present invention said coangulating means, in certain embodiments of my invention, are each comprised of a pair of permanently meshed gear sectors, each gear sector being integral with or affixed to one of said upper pantograph links.

In accordance with yet another principal feature of my invention each coangulating means of certain embodiments of my invention is comprised of a pair of drums which have first and second straps tightly counterwound therearound, each drum being affixed to or integral with the upper end of one of said upper pantograph links and being coaxial with the pivot means by which that pantograph link is pivotably affixed to the platform frame.

In accordance with another principal feature of my present invention yoke means are provided whereby the lower ends of the upper pantograph links on the same side of the pantograph frame can selectively be maintained at different predetermined spacings from each other, whereby the elevation of the platform frame can be selectively determined.

In accordance with another principal feature of my present invention said yoke means may be operated to select said predetermined spacings by depressing or raising the cross member thereof.

In accordance with another principal feature of my present invention a bail-type propelling handle is pivotably affixed to one end of said platform frame and is latchable in an upright position with respect to said platform frame, whereby the baby support and transport apparatus of which said platform frame is a part may be propelled over a supporting ground surface by an adult human user.

In accordance with another principal feature of my present invention said propelling handle may be unlatched from its upright position and folded into close juxtaposition to said platform frame.

In accordance with another principal feature of my present invention said baby seat is provided with a detachable feeding tray similar to a highchair feeding tray.

In accordance with another principal feature of my present invention said platform frame may be provided with a detachable footrest for use by larger babies.

In accordance with another principal feature of my present invention a foldable diaper changing table is detachably affixed to said propelling handle.

In accordance with another principal feature of my present invention said diaper changing table, when unfolded, may be disposed upon said platform frame after the removal of said baby seat therefrom.

In accordance with another principal feature of my present invention a bow is pivotably attached to said platform frame and a fabric sunscreen is attached to said bow, said sunscreen, when unfurled, being so juxtaposed to said diaper changing table that it serves as a modesty screen.

For a fuller understanding of the nature and objects of my present invention, reference should be had to the following detailed description, taken in connection with the accompanying drawings.

DESCRIPTION OF THE PREFERRED EMBODIMENTS

Figure 1:
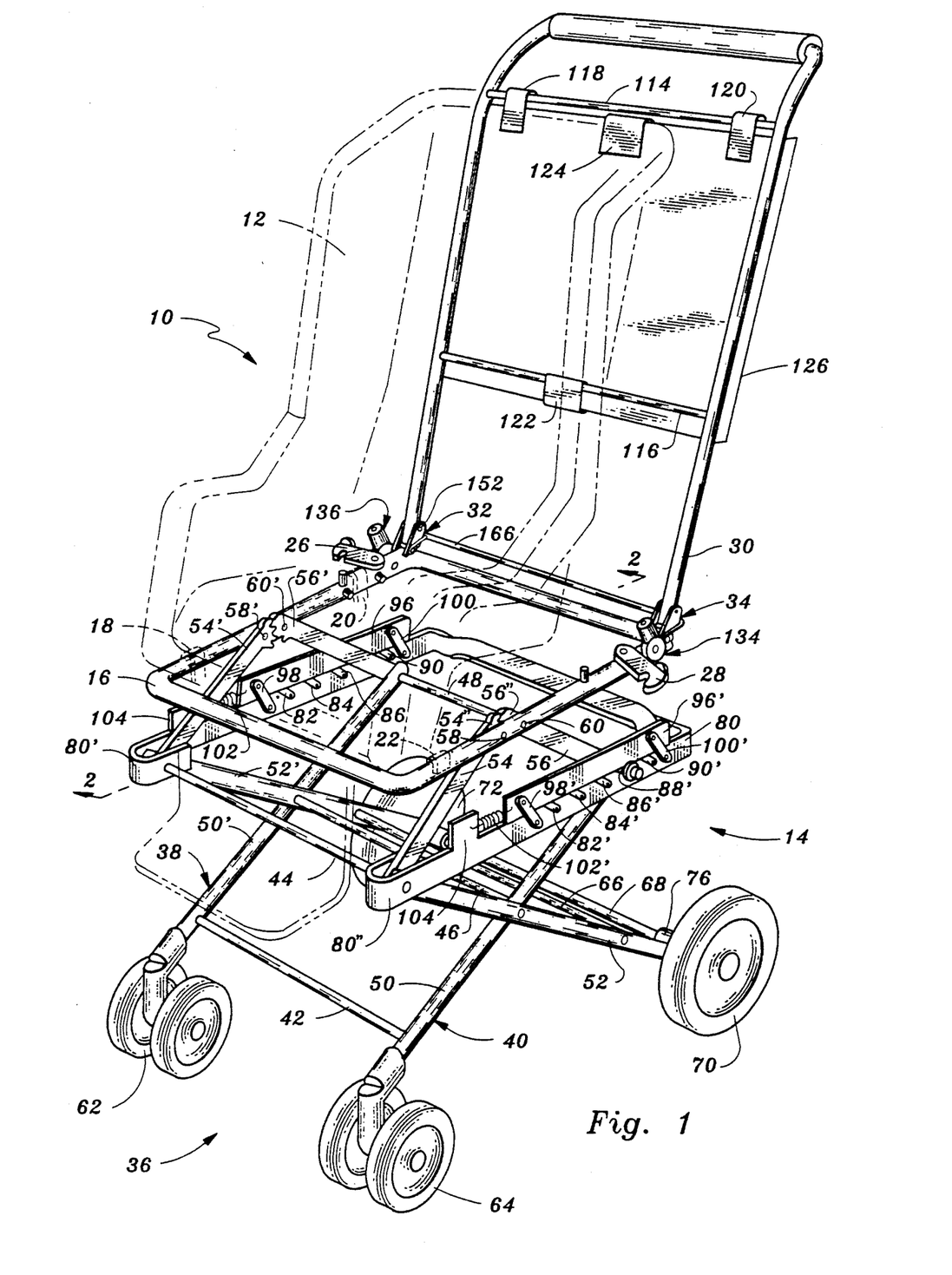
FIG. 1 is a perspective view (partly in phantom) of a multi-function baby support and transport device constructed in accordance with my invention.

Referring now to FIG. 1, there is shown a multi-function baby support and transport device 10 of the first preferred embodiment of my invention.

As seen in FIG. 1, baby support and transport device 10 is comprised of two main parts, viz., a car seat 12, which is shown in phantom for clarity of illustration, and an undercarriage 14.

Car seat 12 is a standard, commercially-available car seat which is slightly modified to adapt it for mounting upon undercarriage 14. It is to be understood, however, that my invention is not limited to multi-function baby support and transport apparatus in which one of the two main parts is a car seat. Rather, it is to be understood that in certain embodiments of my invention the baby seat which is secured to and carried by the platform frame may be a baby seat of the type which is not adapted for use as a car seat. It is to be further understood that in certain embodiments of my invention the baby seat which is mounted upon the platform frame may be permanently attached to the platform frame, rather than being detachably and reattachably mounted thereupon. It is yet further to be understood that in certain embodiments of my invention, which may be called "non-car seat embodiments", the seat mounted upon the platform frame may be provided with a reclining, hinged seat back, to accommodate the baby seated therein in a napping position. In accordance with other non-car seat embodiments of my invention, the baby seat affixed to the platform frame may be provided with outwardly-pivotable chair arms, which, along with the tilted down seat back, serve to define a diaper-changing table.

It is also to be noted that the conventional safety belts or straps of car seat 12 are omitted from the drawings herein for clarity of illustration.

As further seen in FIG. 1, undercarriage 14 is comprised of a platform frame 16 upon which car seat 12 is mounted by means of four rigid hooks 18, 20, 22, 24.

Platform frame 16 is provided with a pair of pivotable latches 26, 28 by means of which car seat 12 may be secured to platform frame 16.

Figures 8, 11:
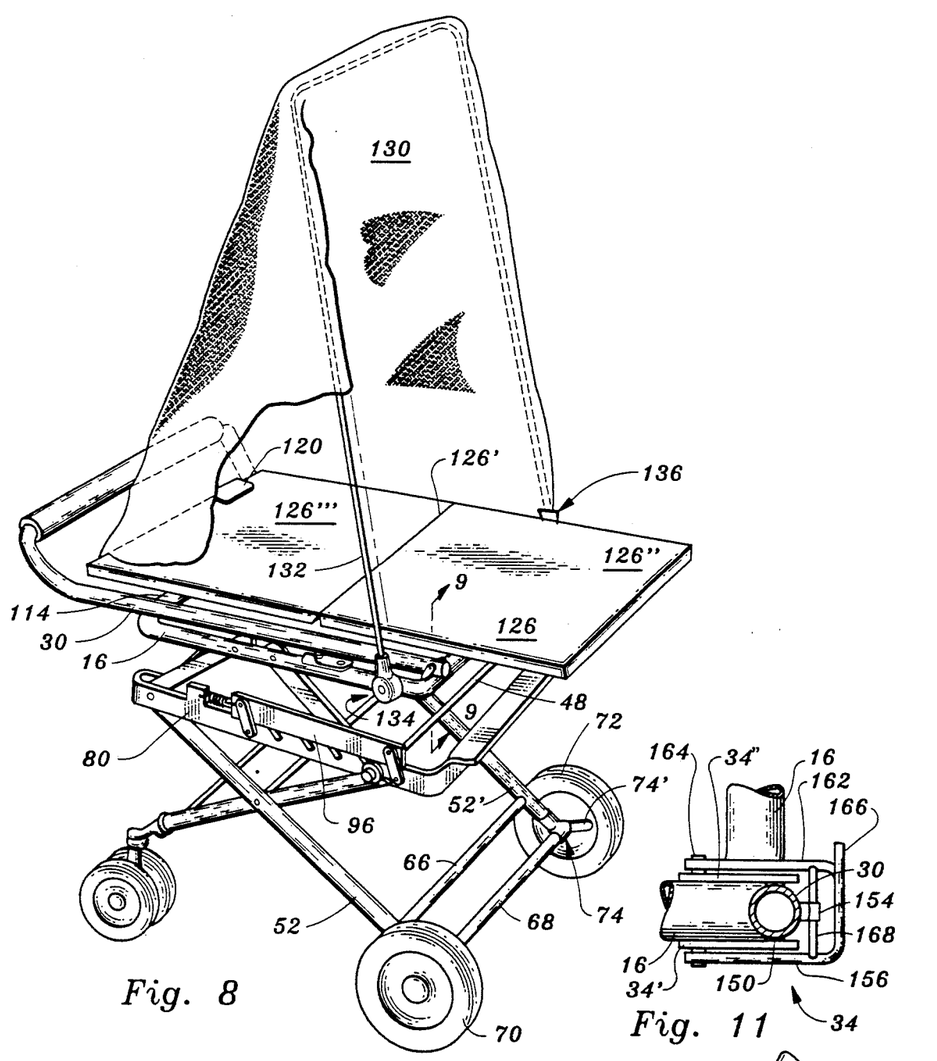
FIG. 8 is a perspective view of the multi-function baby support and transport device of the previous figures, showing the changing table disposed on the platform frame of the undercarriage and the modesty screen and sun shade in its operative position.
FIG. 11 is an oblique view, partially in section, of the handle mount and latch assembly which is also shown in FIGS. 9 and 10.
Figure 9:
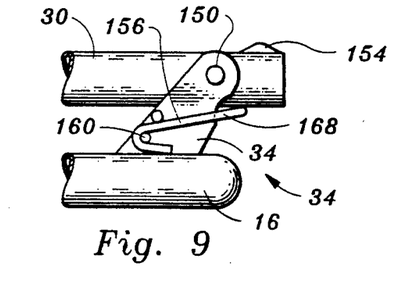
FIGS. 9 and 10 are partial elevational views of the platform frame of the undercarriage shown in FIG. 8, both taken on plane 9—9 of FIG. 8, showing the means for locking the propelling handle of the multi-function baby support and transport device in its upright, operative position, or releasing the same for folding against the platform frame.
Figure 10:
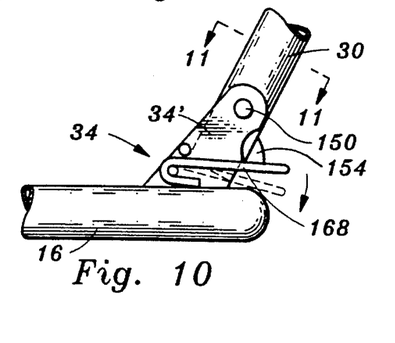

A bail-type propelling handle 30 is pivotably affixed to the rear end of platform frame 16 by means of pivot assemblies 32, 34 (see FIGS. 9 through 11).

As further seen in FIG. 1, platform frame 16 is mounted upon a pantograph frame 36 which is a principal feature of my invention.

As also seen in FIG. 1, pantograph frame 36 is comprised of a right-hand pantograph linkage 38 and a left-hand pantograph linkage 40, which are interconnected by means of a plurality of transverse bars 42, 44, 46, 48, etc.

As also seen in FIG. 1, left-hand pantograph linkage 40 is comprised of a lower front link 50, a lower rear link 52, an upper front link 54, and an upper rear link 56.

Right-hand pantograph linkage 38 is correspondingly comprised of lower front and rear links 50' and 52', upper front link 54', and upper rear link 56'.

Lower links 50, 52 are pivotably joined together by one end of a transverse bar 46, and lower front and rear links 50', and 52' are pivotably joined together by the other end of transverse bar 46.

Lower links 50, 50' are rigidly maintained in parallel relationship by a transverse bar 42. Lower links 52, 52' are rigidly maintained in parallel relationship by a transverse bar 66.

Lower link 52 and upper front link 54 are pivotably joined together by one end of a transverse bar 44, and lower link 52' and upper front link 54' are also pivotably joined together by the other end of transverse bar 44.

Lower link 50 and upper rear link 56 are pivotably joined together by one end of a transverse bar 48, and lower link 50' and upper rear link 56' are pivotably joined together by the other end of transverse bar 48.

The upper ends of upper links 54, 56 are pivotably affixed to platform frame 16 by pivot pins 58, 60 respectively.

The upper ends of upper links 54', 56' are pivotably affixed to platform frame 16 by means of pivot pins 58', 60'.

A caster wheel assembly 62 of well-known type is pivotably affixed to the lower end of lower link 50', and a caster wheel assembly 64 of well-known type, substantially identical to caster wheel assembly 62, is pivotably affixed to the lower end of lower link 50.

As best seen in FIG. 8, the lower ends of links 52, 52' are joined together, and rigidly maintained in parallel relationship, by a transverse bar 66.

As also best seen in FIG. 8, an axle 68 extends between and is journaled in the lower ends of lower links 52, 52', and wheels 70, 72 are rotatably mounted on the outer ends of axle 68.

As also shown in FIG. 8, axle 68 passes through a wheel mount assembly 74, including a brake of well-known type operated by a brake lever 74', which wheel mount assembly is irrotatably mounted on and forms the lower end of lower link 52'.

Axle 68 passes through a similar wheel mount assembly 76 (FIG. 1) which is irrotatably mounted on the lower end of lower linkage 52.

Figure 2:
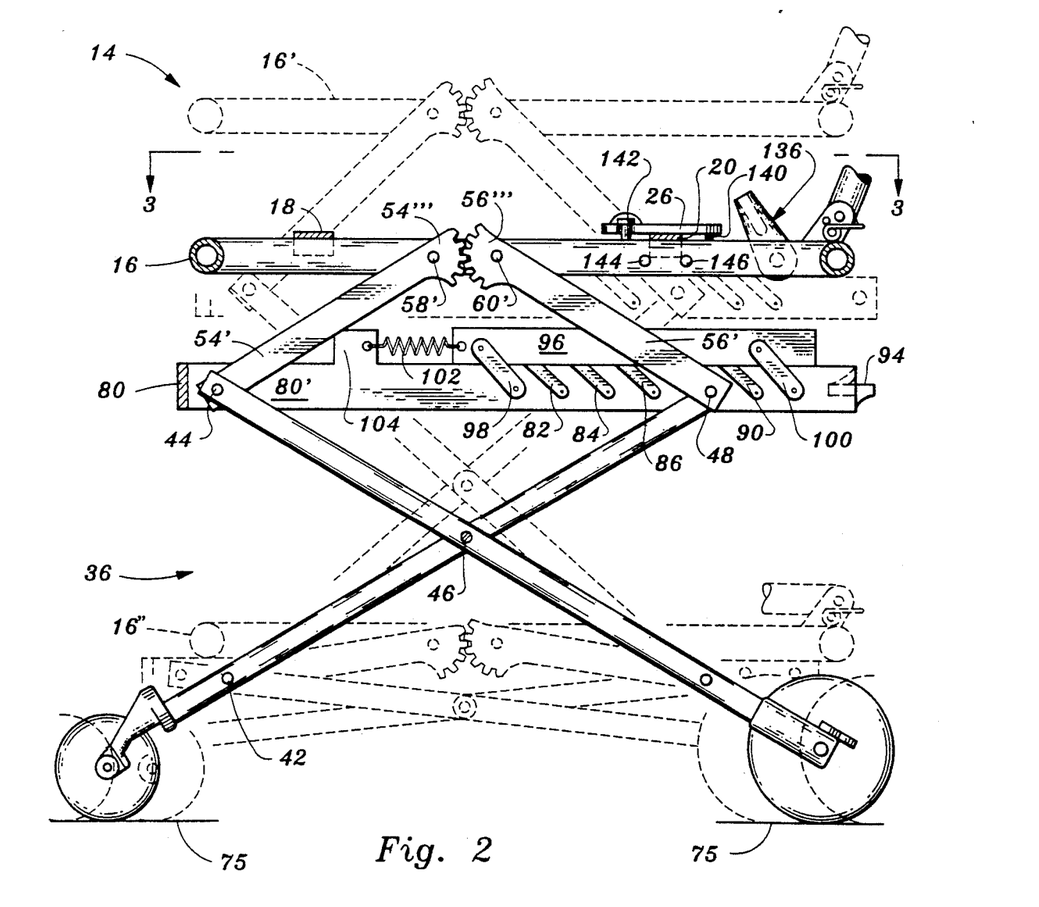
FIGS. 2 and 3 show in detail the undercarriage portion of the multi-function baby support and transport apparatus shown in FIG. 1.

Referring again to FIG. 1, and comprising the same with FIG. 2, it will be seen that the upper end of each upper link 54, 54', 56, 56', takes the form of a gear sector, and that the associated pairs of pivots 58, 60 and 58', 60', are so spaced that the teeth of their associated pairs of gear sectors remain in engagement at all times.

Thus, for example, as seen in FIG. 2, the upper end of link 54' takes the form of a gear sector 54''', and the upper end of link 56' takes the form of a gear sector 56'''. Further, pivot pins 58', 60' are so spaced apart that the teeth of gear sectors 54''', 56''' remain at all times in engagement.

Further, as will be evident to those having ordinary skill in the art, informed by the present disclosure, gear sectors 54'', 56'' of upper links 54, 56 (FIG. 1) are also maintained in constant engagement by the spacing of pivot pins 58, 60.

Thus, it will be evident to those having ordinary skill in the art, informed by the present disclosure, that so long as undercarriage 14 is disposed upon a horizontal plane surface, with wheel assemblies 62, 64, 70, 72 in contact with that surface, platform frame 16 will be constrained to remain at all times parallel to that surface, at whatever height platform frame 16 is elevated above that surface.

Thus, as shown in FIG. 2, pantograph frame 36, which is a principal feature of my present invention, serves to maintain platform frame 16 parallel to horizontal, planar ground surface 75, whether it is in its fully elevated or raised highchair position 16' or in its lowermost, undercarriage fully collapsed, position 16'', or in some intermediate position 16 (shown in solid lines).

Pantograph frame 36 is further comprised of an elevation setting yoke 80 (FIGS. 1, 2, 4 and 8).

Comparing FIGS. 1 and 2, it will be seen that yoke 80 is a rigid, generally U-shaped member which is comprised of two side legs 80', 80'' and a cross leg or cross bar 80''' which joins them and is integral with them.

As best seen in FIG. 1, the forward end of each side leg 80', 80'' is pivotably affixed to one end of pivot rod 44, to which the forward ends of the pantograph links 52, 52', 54, 54' are also pivotably affixed.

Thus, for example, the forward end of side leg 80' is pivotably affixed to pivot rod 44, and links 52' and 54' are also pivotably affixed to pivot rod 44. Similarly, the forward end of side leg 80'' is pivotably affixed to pivot rod 44, and the forward ends of pantograph links 52 and 54 are also pivotably affixed to pivot rod 44.

As may also be seen by comparison of FIGS. 1 and 2, a plurality of oblique slots 82, 84, 86, 90 are provided in the upper edge of side leg 80', which slots extend to and through the upper edge of side leg 80'.

As best seen in FIG. 1, a corresponding plurality of oblique slots 82', 84', 86', 90' is provided in the upper edge of side leg 80''.

As will be evident to those having ordinary skill in the art, informed by the present disclosure, each cooperating pair of slots, e.g., 82, 82', is so located along the respective upper edges of the side legs 80', 80'' as to correspond to a desired elevation of platform frame 16.

As may be seen by comparison of FIGS. 1 and 8, pivot rod 48 is of such length, and so transversely positioned, that its opposite ends are normally received in one pair of corresponding slots, e.g., 88, 88'. As explained hereinabove, the rearward ends of pantograph links 50, 56, 50', 56' are pivotably affixed to pivot rod 48.

The outer ends of pivot rod 48 which extend beyond side legs 80', 80'' are preferably fitted with a pair of caps, such as the well known mushroom caps, between which yoke 80 is close-fittingly received.

It will also be noted, in FIG. 1, for example, that a major portion of cross bar 80''' is overturned by about 90°, thus forming what will be called the "level lock control bar" or "level lock control pedal" (94) herein.

As will be evident to those having ordinary skill in the art, informed by the present disclosure, particularly in view of FIG. 2, each associated pair of slots, e.g., 82, 82', corresponds to a particular height-setting or elevation of platform frame 16.

For example, the maximum height setting, called herein the "high highchair position", is the height setting in which the respective ends of pivot rod 48 are received in slots 82, 82'. The next height setting or elevation of platform frame 16, called herein the "low highchair position", is the setting in which the opposite ends of pivot rod 48 are received, respectively, in slots 84, 84'.

Slot pair 86, 86' corresponds to what is called the "upper stroller position" herein, and slot pair 88, 88' corresponds to what is called the "lower stroller position" herein.

Slot pair 90, 90' corresponds to what is called the "fully collapsed" position herein, which is the fully folded position shown by platform frame position 16'' in FIG. 2, in which undercarriage 14 is folded into the extremely compact form in which it is most conveniently handled, and stored in a small space, such as an automobile trunk; even the trunk of a very small automobile.

As further seen in FIG. 1, each side leg 80', 80'' is provided with a locking bar 96, 96', which locking bars serve to retain the respective ends of pivot rod 48 in whatever pair of slots they currently occupy.

Thus, as seen in FIG. 1, the opposite ends of pivot rod 48 are located respectively in slots 88, 88', and are retained in those slots by the action of locking bars 96, 96'. Referring particularly to locking bar 96', as shown in FIG. 1, it will be seen that locking bar 96' is part of a parallelogram linkage which also includes oblique links 98', 100'.

As further seen in FIG. 1, a coil spring 102' extends between an ear 104' of side leg 80'' and one end of locking bar 96'. Thus, locking bar 96' is resiliently biased toward the upper edge of side leg 80''. The strength of spring 102', i.e., its contractile force, is sufficiently great so that locking bar 96' is normally strongly biased against the upper edge of side leg 80'', thus looking the left end of pivot rod 48 in whatever slot it currently occupies.

As further seen in FIG. 1, locking bar 96 is also a part of a parallelogram linkage which also includes oblique links 98, 100. Further, coil spring 102 and an ear 104, corresponding to spring and ear 102' and 104' respectively, are provided to strongly resiliently bias locking bar 96 against the upper edge of side leg 80'.

Thus, it will be seen that locking bars 96, 96' and their associated oblique links and coil springs normally serve to resiliently retain the ends of pivot rod 48 in the slots in which they are currently engaged, thus maintaining platform frame 16 at its currently set height level or elevation.

As will also be evident to those having ordinary skill in the art, the depression of level lock control pedal 94 results in the raising of the respective ends of pivot rod 48 from the slots in which they are currently engaged, and the raising of the locking bars 96, 96' from the respective upper edges of their associated side legs 80', 80'', whereby the ends of pivot rod 48 escape from the slots in which they are currently engaged and thus can be positioned in a new pair of slots.

In a working model of my invention I have discovered that the height setting mechanism shown in the drawings and hereinabove described provides a convenient and simple method of selective height setting, which can be executed by virtually any user of the device of my invention, and which can be learned almost immediately by reference to a simple instruction sheet.

Thus, platform frame 16 can be raised to any desired one of the available height settings by placing one foot on transverse bar 66 and pulling upward on propelling handle 30 until platform frame 16 is slightly above the desired position, whereafter a slight downward thrust on propelling handle 30 results in the seating of the ends of pivot rod 48 in the corresponding pair of slots, and the return of locking bars 96, 96' to their locking position.

Any desired downward movement of platform frame 16 from one available position to another is also simply accomplished, by depressing control pedal 94 and at the same time pushing downward on handle 30 until platform frame 16 is slightly above the desired position, whereafter control pedal 94 is released and a slight additional downward thrust on handle 30 seats the ends of pivot rod 48 in the corresponding pair of slots.

If desired, an additional simple mechanical latch may be provided adjacent each locking bar 96, 96' whereby each locking bar may be positively locked against the upper surface of its associated side leg 80', 80''. The provision of many such locking mechanisms will occur to those having ordinary skill in the art, without the exercise of invention and without undue experimentation. It has been found in the use of an actual working model of my invention, however, that with the correct selection of coil springs 102, 102' the provision of such a positive locking means is generally not necessary, except perhaps to comply with a government regulation or insurance requirement.

Figure 3:
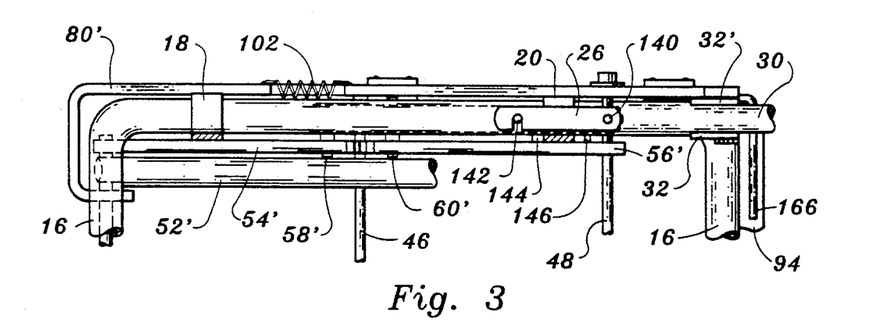

Referring now to FIG. 3, it will be seen that latch 26 is pivotably affixed to the upper surface of platform frame 16 by means of a pivot pin 140, and is provided at its other end with a locking slot which coacts with a headed rivet 142 to clamp seat hook 20 to platform frame 16. The lower end of headed rivet 142 is affixed to platform frame 16.

As may be seen by comparison of FIGS. 2 and 3, a pair of short rivets 144, 146 are affixed to platform frame 16 in selected positions such that hook 20 must be disposed over platform frame 16 in a location where it is correctly positioned for cooperation with latch 26.

Substantially identical rivets are provided for the pivotable mounting of latch 28 on platform frame 16 (FIG. 1), etc.

Figures 4, 7:
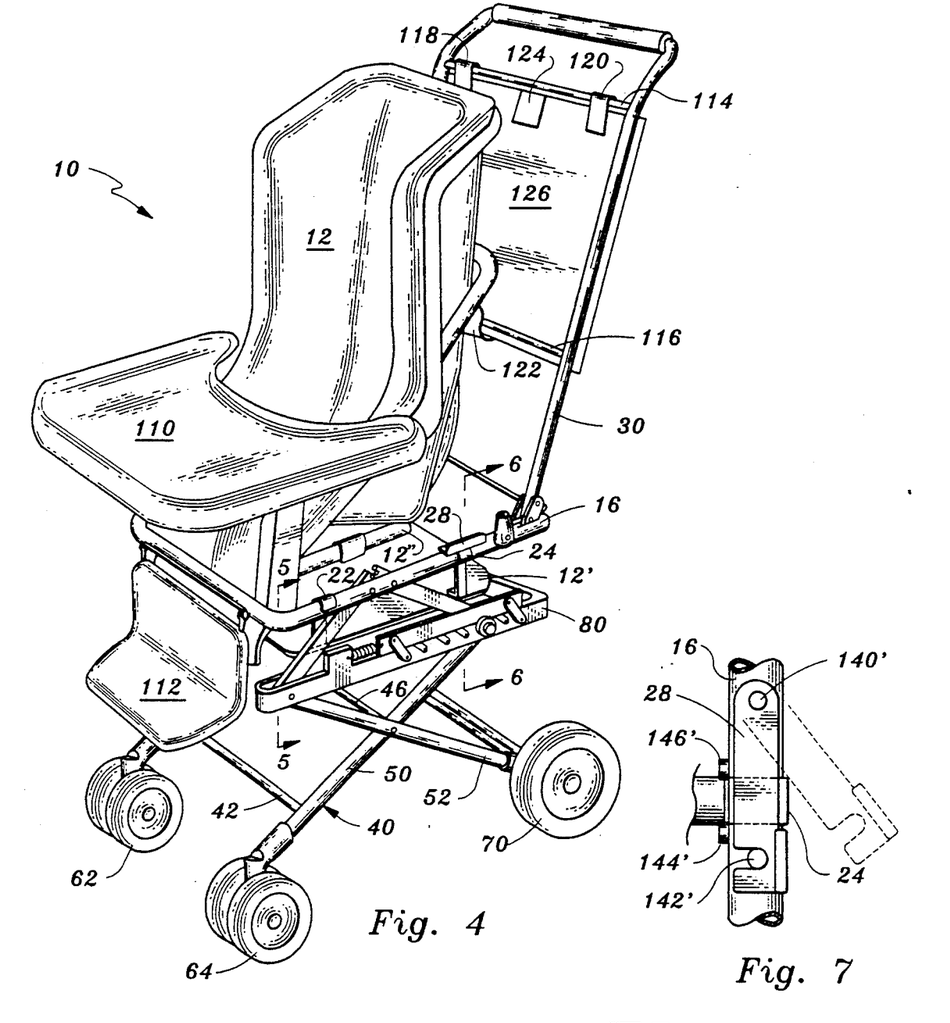
FIG. 4 is a perspective view of the multi-function baby support and transport apparatus of FIG. 1 with the feeding tray secured to the car seat.
FIG. 7 is a plan view of the latching means by which the car seat of FIG. 4 is secured to the undercarriage.

Referring now to FIG. 4, it will be seen that car seat 12 is preferably modified in such manner that a feeding tray 110 can be detachably mounted thereon, in the position shown in FIG. 4. The provision of detachable attaching means for detachably attaching feeding tray 110 to car seat 12 is within the scope of those having ordinary skill in the art, without the exercise of invention or undue experimentation, and thus such detachable attaching means is not shown or described herein.

In accordance with the principles of my invention, demountable attaching means are provided on propelling handle 30 whereby feeding tray 110 may be attached to propelling handle 30, between propelling handle 30 and car seat 12, when not in use. The provision of detachable mounting means whereby to detachably mount feeding tray 110 upon propelling handle 30 is within the scope of those having ordinary skill in the art, without the exercise of invention or undue experimentation and thus such demountable mounting means are not shown or described herein.

As a further feature of my invention, a foot rest 112 may be affixed to the forward edge of platform frame 16, for larger infants. The provision of footrest 112 and suitable means for affixing the same to the forward edge of platform frame 16 is within the scope of those having ordinary skill in the art, without the exercise of invention or undue experimentation, and thus footrest 112 and said affixation means are not shown or described herein.

Referring again to FIG. 1, it will be seen that propelling handle 30 is provided with a pair of transverse stiffening bars 114, 116. Stiffening bars 114, 116 pass through suitable aligned bores in the side members of propelling handle 30 and are affixed therein, whereby stiffening bars 114, 116 are rigidly perpendicularly attached to the side members of propelling handle 30.

As further seen in FIG. 1, a folding diaper changing table 126 is affixed to stiffening bars 114, 116 by means of clips 118, 120, 122.

Further, a clamp 124 is provided whereby the two hinged halves of folding changing table 126 are maintained together in face-to-face relation when folding changing table 126 is not in use.

Referring again to FIG. 4, it will be seen that car seat 12 is provided with integral, outwardly projecting flanges 12', 12" which are portions of the sides of the base of car seat 12.

It is to be understood that car seat 12, in the embodiment of my invention shown and described herein, is a commercially available car seat of a type made and sold by the Cosco Manufacturing Company, which has been modified by the removal of two downwardly projecting flange portions of its base, thus providing outwardly projecting flanges 12', 12".

It is further to be understood that outwardly projecting flanges 12', 12" extend along the respective sides of the base of car seat 12, and that the four seat hooks 18, 20, 22, 24 (FIG. 1) are affixed thereto, as by riveting. Thus, as seen in FIG. 5, seat hook 22 is affixed to flange 12' by means of a rivet 149; and as seen in FIG. 6 seat hook 24 is affixed to flange 12' by rivet 148.

Figure 5:
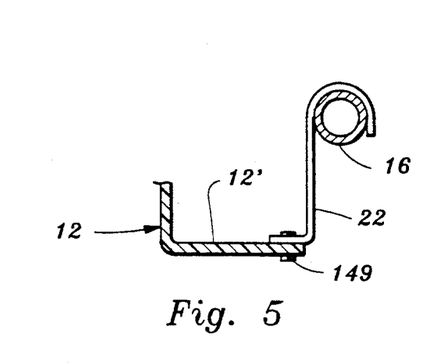
FIGS. 5 and 6 are sectional views of the baby support and transport apparatus of the previous figures, taken on planes 5—5 and 6—6 of FIG. 4.

As further seen in FIG. 5, seat hook 22 is close-fittingly disposed over platform frame 16 when car seat 12 is mounted in platform frame 16.

Figure 6:
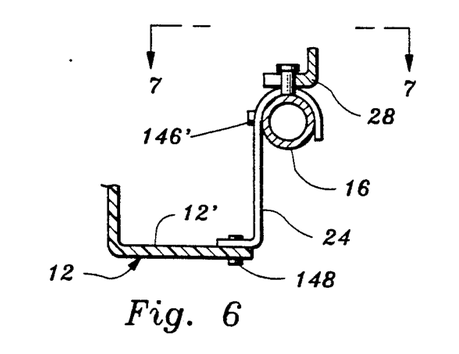

As seen in FIG. 6, seat hook 24 is close-fittingly disposed over platform frame 16 when car seat 12 is mounted in platform frame 16.

As also seen in FIG. 5, no latching means is provided for latching seat hook 22 to platform frame 16, it having been determined in the testing of an actual embodiment of the present invention that such latching means is unnecessary.

As may be seen by comparison of FIGS. 6 and 7, seat hook 24 is latched to platform frame 16 by means of latch 28, cooperating with pivot rivet 140' and headed rivet 142' in the manner illustrated in FIG. 3 in connection with latch 26.

Referring now to FIG. 8, there is shown folding changing table 126 in its operative condition, in which it is disposed on propelling handle 30, which itself is folded onto the top of platform frame 16. Changing table 126 is retained on handle 30 by means of clips 118, 120, coacting with stiffening bar 114.

In an embodiment of my invention which was actually constructed and tested changing table 126 was fabricated from two panels of light, rigid material, which panels were contained in a common envelope of flexuous sheet material, the length of the envelope sufficiently exceeding the length of the two rigid members taken together that the envelope effectively provided a "live hinge" 126' therebetween.

Thus, as seen in FIG. 8, changing table 126 is essentially comprised of two segments 126", 126'" which are joined at their common edge by "living hinge" 126'.

As may be seen by comparison of FIGS. 1 and 8, changing table 126 is supported in its operative position by stiffening bars 114, 116, and by one end of platform frame 16.

When changing table 126 is no longer needed, and propelling handle 30 is to be reerected to its propelling position, panel 126'" is folded into face-to-face contact with segment 126", and the two clamped together by means of clamp 124 (FIG. 1).

Also shown in FIG. 8 is a cloth sunshade or modesty screen 130 which is one of the features of my invention. As seen in FIG. 8, one edge of sunshade or modesty screen 130 is affixed to a bow 132, the ends of which are respectively pivotably affixed to platform frame 16 by pivot assemblies 134, 136. As indicated in FIG. 2, bow 132 is selectively removable from pivot assemblies 134, 136 at the option of the user of the device of my invention. Suitable means for securing the edge of sunshade 130 remote from bow 132 to the outer edge of panel or segment 126'" of changing table 126 will be provided by those having ordinary skill in the art, if desired, without the exercise of invention or undue experimentation.

As a further feature of my invention, a suitable panel of mosquito netting or the like may be substituted for sunshade 130, or may be provided in addition to sunshade 130, such that either a light-permeable insect barrier or a sunshade may be selected.

It is also to be understood that in accordance with a principal feature of my invention bow 132 may be sufficiently tall, and sunshade 130 sufficiently large, so that when seat 12 is in place as shown in FIG. 4, sunshade 130 is reversed, and bow 132 is positioned at such an angle that its outer edge is substantially above the side of platform frame 16 remote from pivot assemblies 134, 136, sunshade 130 is draped over seat 12 and a baby seated therein, with the portion of sunshade 130 remote from bow 132 draped over seat 12 and extending between seat 12 and propelling handle 30, thus shading from sun exposure the baby or infant seated in seat 12.

The pivot means by which propelling handle 30 is pivotably affixed to platform frame 16, and the means employed for locking propelling handle 30 in its upright, operative position (FIGS. 1 and 4) are shown in detail in FIGS. 9 through 11.

As seen in FIGS. 9 through 11, handle pivot assembly 34 is comprised of two upstanding ears 34', 34", the lower ends of which ears of which are affixed, respectively, to platform frame 16, as by brazing, welding, or the like.

As seen in FIG. 11, ears 34', 34" are spaced apart by a distance slightly greater than the outside diameter of one end of propelling handle 30.

As may be seen by comparison of FIGS. 9 and 11, a suitable pivot pin or rivet 150 passes through cooperating aligned bores in ears 34', 34", and through bores passing through opposite sides of the tubing wall of propelling handle 30. Pivot pin 150 passes through ears 34' and 34", and through propelling handle 30, thus pivotably mounting propelling handle 30 between ears 34', 34".

Pivot assembly 32 (FIG. 1) is substantially identical to pivot assembly 34, except as hereinafter described.

Thus, it will be seen that propelling handle 30 is pivotably mounted on platform frame 16 by means of ears 32', 32", 34', 34'", and pins 150, 152.

As further seen in FIGS. 9 through 11, a locking protuberance 154 is raised near the open end of propelling handle 30.

As seen in FIG. 9, a rigid formed wire arm 156 extends around a fixed pin or rivet 160, and the lower end of formed wire arm 160 bears upon platform frame 16.

As best seen in FIG. 11, a formed wire arm 162 similar to arm 156 passes around a pin 164 similar to pin 160, and grasps pin 164 as arm 156 grasps pin 160.

Referring now to FIG. 11, and comparing it with FIG. 1, it will be seen that a bail 166 is affixed to or integral with the outer ends of arms 156 and 162, and that bail 166 extends from pivot assembly 34 to pivot assembly 32 where it is affixed in the same manner to a pair of right hand arms which are substantially identical to arms 156, 162 and which are juxtaposed to and cooperate with ears 32', 32" as arms 156, 162 are juxtaposed to and cooperate with ears 34', 34'".

Thus, it will be seen that depression of bail 166 causes the outer ends of all four arms 156, 162, etc., to move downwardly as shown in phantom in FIG. 10.

As best seen in FIG. 11, a latching member 168 passes between the outer ends of arms 156, 162 and is secured to them.

Latching member 168 is so positioned on arms 156, 162 that when propelling handle 30 is in its upright position and bail 166 is released, latching member 168 bears against the top of locking projection 154, and thus locks propelling handle in its upright, propelling position.

The arms associated with ears 32', 32" in pivot assembly 32 are similarly provided with a latching member which coacts with a locking protrusion raised on the outer end of the portion of propelling handle 30 pivoted therein to lock propelling handle 30 in its upright, propelling position when bail 166 is released.

As particularly seen in FIG. 9, pivot assembly 34 is so constructed and arranged than when bail 166 is fully depressed propelling handle 130 may be manually moved forward into its horizontal position shown in FIG. 8.

Thus, it will be seen that pivot assemblies 32, 34, and their associated bail 166, permit the user of the device of the preferred embodiment to selectively either lock propelling handle 30 in its upright, propelling position, as shown in FIGS. 1 and 4, or, selectively, to unlatch propelling handle 30 and manually position it in its horizontal position (FIG. 8).

It will thus be seen that the objects set forth above, among those made apparent from the preceding description, are efficiently attained, and since certain changes may be made in the above constructions without departing from the scope of my present invention it is intended that all matter contained in the above description or shown in the accompanying drawings shall be interpreted as illustrative only, and not in a limiting sense.

It is also to be understood that the following claims are intended to cover all of the generic and specific features of my invention hereindescribed, and all statements of the scope of my invention which, as a matter of language, might be said to fall therebetween.

What is claimed is:

1. Multi-function baby support and transport apparatus, comprising:
    a vertically extensible undercarriage including wheels mounted thereupon such that said undercarriage can be propelled over a horizontal plane surface, said undercarriage including baby seat receiving means, first and second vertically extensible linkages, and transverse members joining said linkages, each of said linkages comprising first and second upper links pivotally attached thereto and pivot means whereby the upper ends of said upper links are pivotably affixed to said baby seat receiving means about axes;
    coagulating means for coupling upper ends of the upper links and for maintaining each linkage at substantially the same angle relative to a horizontal plane containing the axes of said pivot means while said angle varies in accordance with an elevation of said baby seat receiving means above said plane surface;
    retaining means for retaining two parts of at least one of said linkages at any selected one of a plurality of predetermined distances apart and thus retaining said undercarriage in any selected one of a plurality of configurations, each of which configurations corresponds to a particular elevation of said baby seat receiving means above said plane surface; and
    securing means for securing a baby seat to said baby seat receiving means.

2. Multi-function baby support and transport apparatus as claimed in claim 1 in which said retaining means can be disengaged to permit changing of the elevation of said baby seat receiving means by operation of a single interconnected control member.

3. Multi-function baby support and transport apparatus as claimed in claim 1 in which said undercarriage is fully collapsed when said baby seat receiving means is located at a lowest one of said selected ones of said elevations and thus said undercarriage is compacted to a configuration which, upon removal of said baby seat from said baby seat receiving means, occupies minimum storage space.

4. Multi-function baby support and transport apparatus as claimed in claim 1 in which the distance between a body weight bearing portion of said baby seat and said horizontal plane surface is equal to the distance between a body weight bearing portion of a high chair and the floor on which the high chair stands when said baby seat receiving means is at a highest one of said selected ones of said elevations.

5. Multi-function baby support and transport apparatus as claimed in claim 1 in which said retaining means is constructed and arranged to provide at least three of said elevations.

6. Multi-function baby support and transport apparatus as claimed in claim 1, further comprising a propelling handle which is pivotably attached to said undercarriage and thus is movable between a first, upright propelling position and a second position in which said handle is closely juxtaposed to said baby seat receiving means.

7. Multi-function baby support and transport apparatus as claimed in claim 6, further comprising a diaper changing table which is securable to said propelling handle and is disposable upon said baby seat receiving means.

8. Multi-function baby support and transport apparatus as claimed in claim 7, further comprising a bow pivotably mounted on said baby seat receiving means and a fabric panel which is attachable to said bow to provide a modesty screen over said diaper changing table.

* * * * *